WHERE $R_c \approx R_t$

INVENTOR:
JOSEPH C. SANCHEZ
DAVID W. BARGEN

ATTORNEY:
WILLIAM A. KEMMEL JR.

INVENTOR:
  JOSEPH C. SANCHEZ
  DAVID W. BARGEN
ATTORNEY:
  WILLIAM A. KEMMEL JR.

United States Patent Office 3,388,597
Patented June 18, 1968

3,388,597
MEASURING AND COMPUTING DEVICE
AND METHOD
David W. Bargen and Joseph C. Sanchez, Pasadena, Calif., assignors, by mesne assignments, to Whittaker Corporation, Los Angeles, Calif.
Filed Oct. 5, 1965, Ser. No. 493,085
12 Claims. (Cl. 73—398)

ABSTRACT OF THE DISCLOSURE

A transducer providing voltage output which is directly proportional to the ratio of a selected variable, such as pressure, to only a selected positive power of absolute temperature, such as one. Preferably the transducer involves a bridge circuit (1) whose four resistances are semiconductor strain gage bodies which are subject to the selected variable and temperature being measured with one opposing pair of strain gage bodies being subjected to a first strain and the other opposing pair being subjected to a second substantially different strain, (2) whose power supply is a constant voltage source, and (3) whose output has a shunt resistance adapted to compensate for the temperature function so that the voltage output is directly proportional to the ratio of the selected variable to only a selected positive power of absolute temperature.

---

In general, the present invention relates to a device and method for accurately and directly measuring a selected variable and absolute temperature and simultaneously computing the ratio of said selected variable to temperature. More particularly, the present invention relates to a transducer adapted to have an output voltage which is directly proportional to the ratio of a selected variable such as pressure, force, acceleration, torque and so forth, to absolute temperature.

It has been known for many years that semiconductor materials such as silicon exhibit a change of resistance with strain, e.g., Smith, Physical Review, 94, 42 (1954), as well as temperature, e.g., Herring et al., Physical Review, 101, 944 (1956). The piezoresistance effect has resulted in the use of bodies of semiconductor material as strain gages and the use of such strain gages in transducers as illustrated in U.S. Patent No. 3,049,685 issued on Aug. 14, 1962 to William V. Wright, Jr. However, to date when the piezoresistance of a body of semiconductor material has been used, the temperature effect has been compensated so that the transducer output was independent of temperature. For example, in FIG. 1, a conventional bridge circuit diagram for a pressure transducer using the piezoresistance effect is illustrated wherein the substantially equal resistances are four bodies of P-type semiconductor material. Such bodies are usually attached to an appropriate carrier structure in the transducer so that one opposing pair of resistances $R_t$ is subjected to tension while the other opposing pair of resistances $R_c$ is subjected to compression. With such arrangement, the effect of temperature as illustrated in FIG. 2 for a constant current power source (Curve I) and a constant voltage power source (Curve II). As shown in FIG. 2, the effect of temperature is much less when a constant current power source (infinite impedance source) is used than when a constant voltage power source (zero impedance source) is used. Consequently, it is conventional to use a constant current source as shown in FIG. 1 in most transducers such as pressure transducers, accelerometers, and so forth. Furthermore, to compensate for the increase in transducer sensitivity with temperature, usually a resistance equal to approximately five times the resistance of one of the bridge resistances is connected in parallel with the constant current source. Such arrangement substantially rotates the constant current curve (Curve I), i.e., decreases its slope, so that it approximates the intermediate resistance position (Curve III), i.e., produces a pressure transducer whose voltage output is substantially unaffected by temperature. Of course, it is possible to start with a constant voltage source and by putting a resistance in series therewith to substantially rotate the constant voltage curve (Curve II), i.e., increase its slope, to a similar horizontal position. However, such solution to the temperature compensation problem was generally not used by the prior art since it required a much higher voltage power source and produced a much larger power consumption. In other words, the usual prior art semiconductor strain gage transducer utilized a constant current power source so that the voltage output could more easily and economically be made independent of temperature.

As already noted, semiconductor strain gage transducers whose voltage output are independent of temperature are well known to the prior art. Similarly, semiconductor temperature transducers are also known wherein the body of semiconductor material is simply subjected to the temperature being measured and the voltage output of the transducer is proportional to such temperature. Consequently, when the ratio of pressure to temperature is desired, the direct solution is to sense the temperature and pressure independently with different transducers and then use the voltage output of such transducers to compute the ratio of pressure to temperature with a separate electrical circuit. Such arrangement, however, presents a relatively complicated system which because of its number of parts and their complexity is relatively expensive and has significant problems with respect to reliability. Moreover, when it is desired to obtain the relationship to other than the first power of temperature such as its square root, the resulting arrangement is additionally complicated.

Consequently, an object of the present invention is a transducer which is adapted to measure directly the ratio of a selected variable such as pressure to only a selected positive power of absolute temperature without the need of an additional computing electrical circuit.

Another object of the present invention is a transducer which is adapted to measure the ratio of a selected variable such as pressure to only a selected positive power of absolute temperature using the same bodies of semiconductor material in a single transducer.

Still another object of the present invention is a method using bodies of semiconductor material adapted to produce a voltage which is accurately and directly proportional to the ratio of a selected variable to only a selected positive power of absolute temperature.

Other objects and advantages of the present invention will be readily apparent from the following description and drawings which illustrate a preferred exemplary embodiment of the present invention.

In general, the present invention is a method and transducer adapted to provide a voltage which is accurately and directly proportional to the ratio of a selected variable to only a selected positive power of absolute temperature. The transducer includes a first component comprising at least two bodies of semiconductor material with the first of such bodies being subjected to a first strain corresponding to the value of the selected variable being measured and being subjected to the temperature being measured. The second of said bodies is subjected to a second substantially different strain corresponding to the value of the selected variable being measured and is also subjected to the temperature being measured. A second component of the transducer is an electrical bridge circuit having each of said bodies connected to a leg of said circuit. Finally, a third component is a carrier structure supporting said bodies and adapted to translate the effect of the said selected variable into strain on said bodies. The transducer is adapted to provide a voltage which is directly proportional to the ratio of the selected variable being measured to a function of absolute temperature without temperature compensation. In addition, at least one of the components is adapted to compensate for said function so that said voltage output is proportional to the ratio of said selected variable to only a selected positive power of absolute temperature. As used in the present invention, the term "function of absolute temperature" refers to a function such as the linear function $a+bT$, where $a$ and $b$ are constants not equal to zero and $T$ is absolute temperature or some higher order function of absolute temperature, i.e., having additional terms such as $cT^2$ and $aT^3$. Such "function of absolute temperature" results from the usual processing of the bodies of semiconductor material and structure of the transducer and, as noted, it was previously simply compensated to substantially unity. Note Curves I, II and III in FIG. 2. On the other hand, the term "only a selected positive power of absolute temperature" refers to the simple quantity, $T^n$, when $n$ is a selected positive number. Particularly, $n$ is in the range of about $a$, greater than or equal to 0.1 to less than or equal to 2. Thus the temperature function is changed from an unusable, complex random function to a highly useful, simple, selected function. It should be noted that both above mathematical quantities are only accurate approximations of the actual temperature relationship since it is too complex to be defined precisely in practical devices.

In order to facilitate understanding of the present invention, reference will now be made to the appended drawings of specific embodiments of the present invention. Such drawings should not be construed as limiting the invention which is properly set forth in the appended claims.

Figure 3:
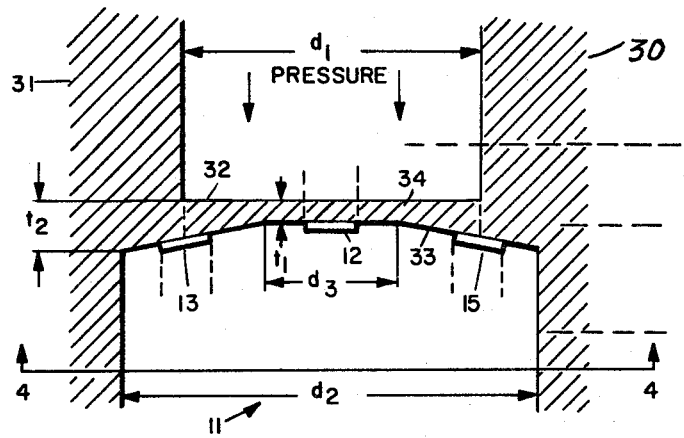
FIGURE 3 is an axial cross section of a preferred specific embodiment of the transducer of the present invention.
Figure 4:
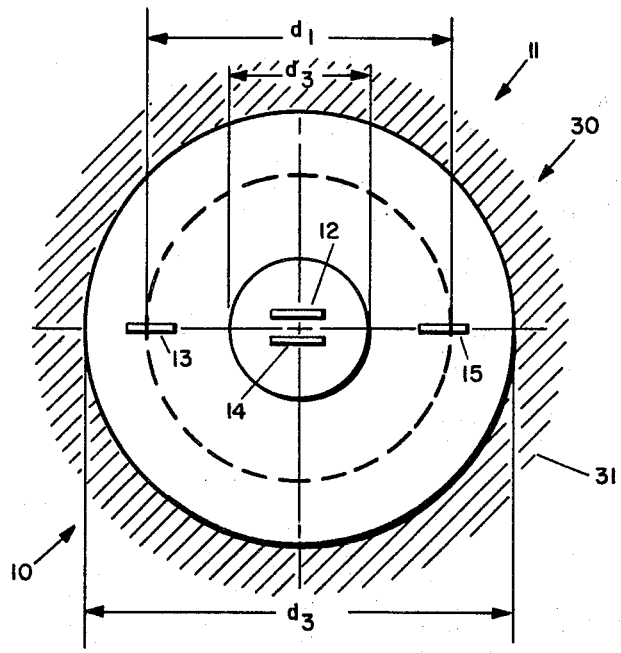
FIGURE 4 is a cross sectional view of FIG. 3 taken along with lines 4—4 of FIG. 3.
Figure 5:
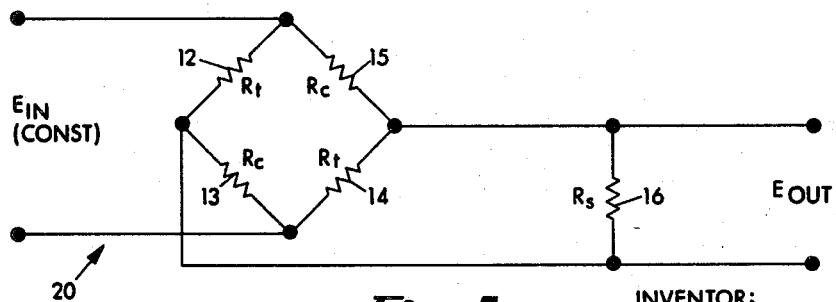
FIGURE 5 is an electrical bridge circuit schematic diagram used as a component of the transducer illustrated in FIGS. 3 and 4.

As illustrated in FIGS. 3–5, a specific embodiment of the present invention is a pressure transducer 10 which is adapted to provide a voltage which is accurately and directly proportional to the ratio of pressure to absolute temperature. The first or sensing component 11 of the transducer 10 includes four bodies 12, 13, 14 and 15 of semiconductor material. Two of said bodies, 12 and 14, are subjected to tension strain corresponding to the pressure being measured and are also subjected to the temperature being measured. The other two of said bodies, 13 and 15, are subjected to compression strain corresponding to the pressure being measured and also are subjected to the temperature being measured. All of the bodies 12, 13, 14 and 15 used the transducer 10 formed by diffusion as described in the aforementioned Wright patent. Thus, the specific bodies used to obtain the test data in FIG. 6 were formed from a wafer of N-type silicon have a resistance of about one ohm centimeter. Such wafer was then doped with boron to a junction depth of about 10 microns to form P-type strain gages having a surface concentration of $1.3 \times 10^{18}$ atoms per cubic centimeter and sheet resistance of $10^5$ ohms per square centimeter. The strain gages cut out of such wafer and used to obtain the transducer test results set forth in FIG. 6 had the following characteristics after bonding with a suitable bonding agent such as an epoxy resin to the carrier structure 30 formed of Ni-Span C nickel alloy:

| | |
|---|---|
| Structural length [1] | inches__ 0.120 |
| Active length [2] | do____ 0.040 |
| Structural width | do____ 0.010 |
| Active width | do____ 0.002 |
| Structural depth | do____ 0.005 |
| Active depth | microns__ 10 |

[1] Structural dimension is the dimension of the supporting N-type silicon.
[2] Active dimension is the dimension of the diffused P-type silicon used as the strain gage.

TABLE I

| Temperature (° F.): | Gage Resistance (ohms) | | | |
|---|---|---|---|---|
| | 12 | 13 | 14 | 15 |
| +250 | 7,598 | 7,229 | 7,104 | 7,484 |
| +65 | 5,250 | 4,977 | 4,898 | 5,125 |
| −65 | 4,044 | 3,822 | 3,765 | 3,925 |

The sensing component 11 is incorporated into the electrical bridge circuit component 20 which is schematically illustrated in FIG. 5 with each of the bodies 12, 13, 14 and 15 of the semiconductor material forming one of its legs. As illustrated, the electrical bridge circuit 20 is supplied by a constant voltage power source (not shown). For the test data set forth in FIG. 6, the power source was simply a battery connection in series with potentiometer. The relationship between the output voltage and the input voltage of the circuit illustrated in FIG. 5 is set forth approximately in the following equation when $R_s$ is disconnected:

$$\frac{E_{out}}{E_{in}} = \frac{R_t - R_c}{R_t + R_c} \quad (1)$$

In such equation all of the strain gages are assumed to have substantially equal resistance and the illustrated shunt resistance $R_s$ is infinite. Analysis of the above equation shows that the difference between $R_c$ and $R_t$ in the above equation is a function of pressure while the sum of $R_t$ and $R_c$ is a function of temperature. Also, there are a variety of electrical circuits equivalent to the circuit illustrated in FIG. 5 wherein the input voltage is related to the output voltage by the ratio of the difference between $R_c$ and $R_t$ to the sum of $R_c$ and $R_t$ or the inverse. Consequently, as used in the present application, the term "electrical bridge circuit" refers to any electrical circuit wherein the ratio of output voltage to input voltage is a function of the ratio of the difference of two resistances to the sum of those resistances or the inverse of such ratio.

Supporting the bodies 12, 13, 14 and 15 is a carrier structure 30 which is adapted to translate the effect of pressure into strain on said bodies. As illustrated in FIGS. 3 and 4, the carrier structure 30 includes a housing 31 having tapered diaphragm 32 integral therewith which forms a clamped edged diaphragm. The bodies 12, 13, 14 and 15 are mounted on the inner surface 33 of the diaphragm 32 while the pressure to be measured contacts the outer surface 34 of the diaphragm 32. A detailed description of the construction and operation of carrier structure 30 is set forth in the copending patent application of William H. McLellan entitled "Improved Pressure Transducer," Ser. No. 424,551 now U.S. Patent No. 3,325,761 filed Jan. 11, 1965, assigned to applicant's assignee and such disclosure is hereby incorporated by reference. In the specific carrier structure utilized in obtaining the transducer test results set forth in FIG. 6, the carrier structure was made of Ni-Span C nickel alloy with an outer surface diameter ($d_1$) of 0.500 inch, an inner surface diameter of 0.600 inch at the top ($d_2$) of the taper and 0.315 inch at the bottom ($d_3$) with the diaphragm thickness being 0.095 inch in the center ($t_1$) and 0.131 inch at its edge ($t_2$).

Figure 6:
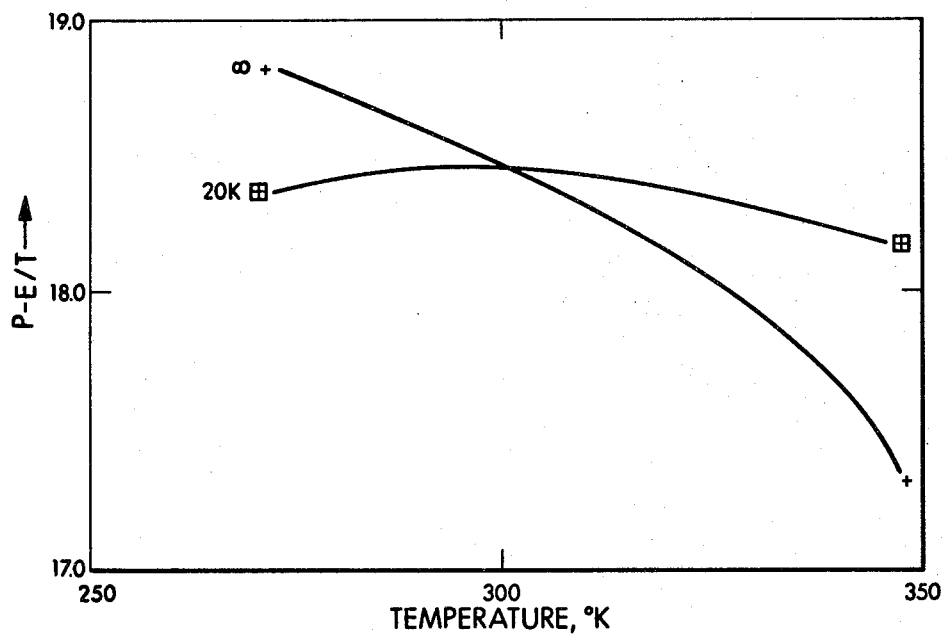
FIGURE 6 is a graph of output of the transducer illustrated in FIGS. 3–5 with and without temperature compensation.

If at this point, the shunt resistance 16 in FIG. 5 is disconnected the transducer 10 is not temperature compensated. Thus the transducer 10, as described, would have a transducer sensitivity curve similar to Curve II in FIG. 2. In other words, equation of the relationship between the output voltage and the input voltage in terms of temperature and pressure is given approximately by the following equation:

$$E_{out} = E_{in} K \frac{P}{a+bT} \qquad (2)$$

where $E_{out}$=transducer output voltage K is a constant, $E_{in}$=transducer input voltage, $P$=pressure, $T$=absolute temperature, and $a$ and $b$ are constants not equal to zero. In short, the transducer is adapted to put out a voltage which is directly proportional to the ratio of pressure to a function of absolute temperature without temperature compensation. However, transducer 10 is temperature compensated by placing the shunt resistance 16 across the voltage output leads as shown in FIG. 5. Such shunt resistance causes the slope of the transducer sensitivity-temperature curve shown in FIG. 2 to decrease, i.e., Curve II is rotated to produce Curve IV. The resulting transducer is then adapted to produce a voltage which is directly proportional to the ratio of pressure to only a positive power of one of absolute temperature. The proper value of shunt resistance can be estimated by analysis but the most accurate value is presently obtained by experiment. Thus for transducer 10, as specifically described, the best experimental value was found to be 20,000 ohms. The proper experimental value was found by incorporating transducer 10 into the bridge circuit described in the patent application concurrently filed herewith of David W. Bargen, entitled Computing Transducer System, Ser. No. 493,049, filed Oct. 5, 1965, assigned to applicant's assignee and whose disclosure is hereby incorporated by reference. As set forth therein, the bridge voltage output is inverted so that it is proportional to the ratio of the first power of absolute temperature to pressure. Then the transducer was subjected to the three temperatures indicated in FIG. 6. At each temperature, for a given input voltage, the output voltage was measured for a series of pressures consisting of 20%, 40%, 60%, 80% and 100% of full scale of the pressure range of the transducer with full scale pressure being 5500 p.s.i.a. A series of shunt resistances was chosen ranging from infinity to 5000 ohms. For simplicity the input voltage was then chosen for each shunt resistance so that the full scale voltage output was one volt. After the test data was taken, the quantity which is the product of the pressure and the output voltage divided by the first power of absolute temperature was computed for temperatures shown in FIG. 6. Such quantity should be constant over the experimental temperature range if only the first power absolute temperature is involved. As shown in FIG. 6, without temperature compensation, there is marked deviation from the chosen constant, i.e., a function of absolute temperature is involved. However, with the shunt resistance temperature compensation, the constant varies only slightly, i.e., the voltage output is accurately and directly proportional to the ratio of pressure to the first power of absolute temperature in the absence of the special inverting bridge circuit. Specifically, the overall error for transducer 10 was about 1.5% for the temperature range tested with temperature compensation and about 4 times that amount without temperature compensation.

The operation of the transducer 10 can readily be understood with reference to the structure described above in connection with FIGS. 3-5. Specifically, after suitable calibration, a voltage input is fed to the transducer. Concurrently, the diaphragm 32 is exposed to the temperature and pressure being measured. Since the reference pressure on the inner surface 33 of the diaphragm is substantially zero, the pressure being measured causes the diaphragm to deflect inwardly. Such deflection places the central strain gages 12 and 14 under tension and the peripherally located strain gages 13 and 15 under compression to produce corresponding changes in the resistance of each arm of the bridge circuit. Concurrently, the strain gages 12, 13, 14 and 15 are subjected to temperature of the gas being measured since the thin metal diaphragm comes rapidly to temperature equilibrium with the gas and the strain gages are mounted on the diaphragm. Also, the shunt resistance 16 performs its function as set forth above so that the temperature effect is correspondingly corrected. The resulting overall change in the bridge resistance produces a voltage output which is proportional to the ratio of pressure to the first power of absolute temperature.

Figure 1:
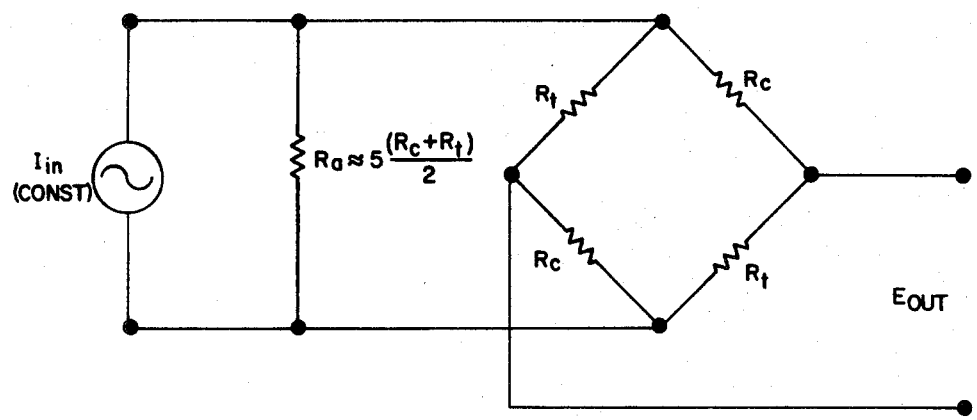
FIGURE 1 is a schematic diagram of a conventional pressure transducer electrical bridge circuit utilizing a constant current power source and compensated for temperature so that the voltage output is independent of temperature.
Figure 2:
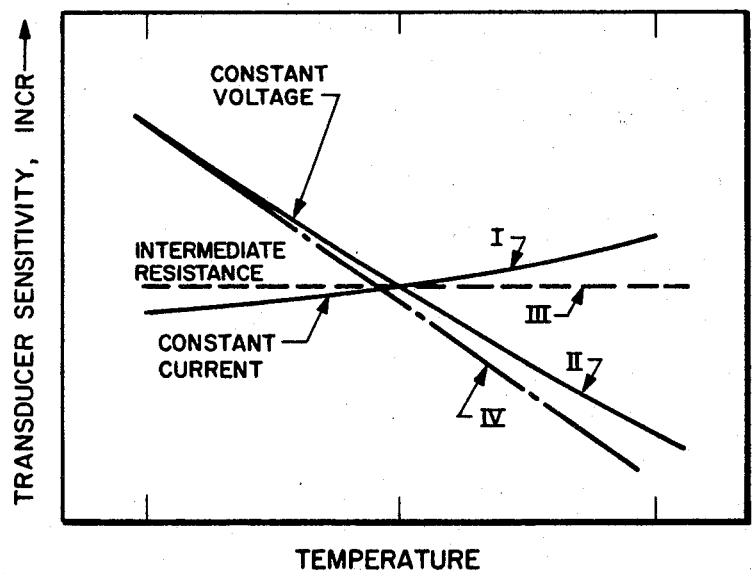
FIGURE 2 is a graph of prior pressure transducer sensitivity versus temperature for various source impedance values as well as the pressure transducer sensitivity of the present invention.
Figure 7:
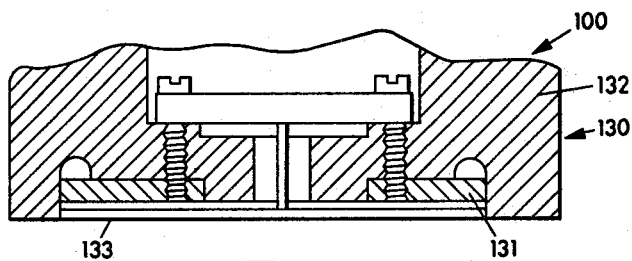
FIGURE 7 is an axial cross section of a portion of another specific embodiment of the present invention.

As set forth above, one method of compensating a pressure transducer so that its voltage output is proportional to the ratio of pressure to absolute temperature is by connecting a shunt resistance across the bridge voltage output. In other words, the pressure transducer described has a transducer sensitivity-temperature slope which is less than proportional to the reciprocal of absolute temperature and the proper shunt resistance increases such slope, i.e., makes it steeper, so that the resulting voltage output is proportional simply to the ratio of pressure to the first power of absolute temperature. In addition, the other components of pressure transducer may be adapted to compensate for the temperature function so that the voltage output of the transducer is proportional to the ratio of pressure to simply only a selected positive power of absolute temperature. For example, the carrier structure may be adapted to compensate for the temperature function. Thus, in FIG. 7, the carrier structure 130 of the pressure transducer 110 has an expansion ring 131. The ring 131 has a higher coefficient of expansion than the housing 132. Consequently, where the diaphragm 133 has a greater coefficient of thermal expansion than the carrier housing 132, the expansion ring 131 over-compensates for the potential slackening of the diaphragm 133 due to temperature rise by also having a larger coefficient of thermal expansion. The excess of expansion of the ring 131 results in decreasing the sensitivity of the transducer to temperature. Consequently, as illustrated in FIG. 2, the transducer sensitivity-temperature curve for a constant voltage source is rotated by such carrier structure to produce Curve IV to give the desired relationship to the ratio of pressure to temperature. The use of the expansion ring 131 or its equivalent to decrease the sensitivity of a clamp edged pressure transducer to temperature is described in detail in a substantially concurrently filed patent application of William H. McLellan, entitled "Temperature Compensated Transducer," Ser. No. 492,605, filed Oct. 4, 1965, now U.S. Patent No. 3,333,472, assigned to applicant's assignee and whose disclosure is hereby incorporated by reference.

A pressure transducer can also be adapted to have its voltage output proportional to the ratio of pressure to only a selected positive power of absolute temperature by the proper regulation of the doping bodies 12, 13, 14 and 15 of semiconductor material. Thus, with reference to the bodies utilized in transducer 10, if the bodies are more lightly doped, the temperature sensitivity is increased producing results similar to those achieved by the compensation means set forth above.

Many other specific embodiments of the present invention will be obvious to one skilled in the art in view of this disclosure. For example, although described specific embodiment of the present invention utilized a Wheatstone bridge structure with four active arms, many other electrical bridge circuits may be utilized including bridge circuits having only two active arms. Also, although the described specific structure utilizes a constant voltage power source, it will be readily understood that a constant current power source with appropriate shunt resistance will produce the same electrical voltage output and thus is equivalent to the constant voltage source. Similarly, in the described specific structure, the strain gages were mounted on a clamped edge diaphragm. Other carrier structures may be utilized such as a deflection beam driven by a post mounted on a clamped edge diaphragm or any other arrangement whereby the variable being measured is translated into strain on the semiconductor strain gage. Furthermore, although specific examples of temperature compensation have been set forth with respect to each component of transducer, it is apparent that other methods of temperature compensation may be utilized to achieve the results of the present invention. See for example, the temperature sensitivity compensation techniques set forth in the paper titled "Recent Developments in Flexible Strain Gages" by J. C. Sanchez and W. V. Wright given at the Instrument Society of America Conference January 17, 1961, Reprint Paper No. 37-SL61-1. Also, it should be noted that the present invention may be used not only to measure the ratio of pressure to absolute temperature but also the ratio of any other variable to absolute temperature which can be measured by strain on semiconductor strain gages. Some examples of such other variables are force, acceleration, and torque.

Figure 8:
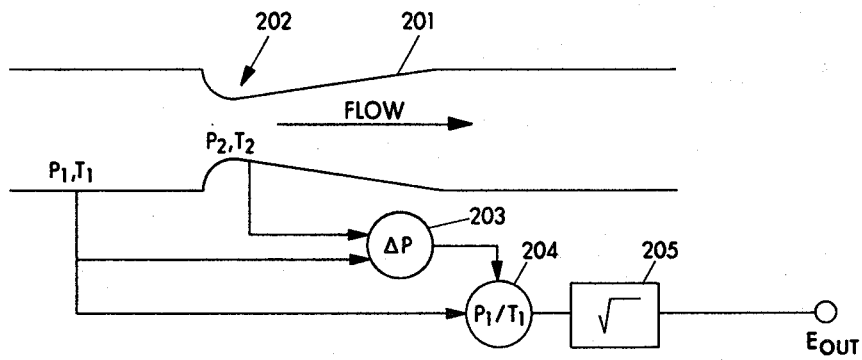
FIGURE 8 is a schematic diagram of a specific application of the present invention.

Finally, the present invention may be used not only to measure the ratio of some selected variable to only the first power of absolute temperature but also other low positive powers of absolute temperature. Although numerous examples of such other uses of the present invention are possible, several specific examples in the field of fluid flow measurement are illustrative. Thus, shown in FIG. 8, is a flow metering transducer 200 adapted to provide a voltage which is accurately and directly proportional to the mass flow rate of a gas in a conduit 201 containing a venturi or orifice gas flow control means 202. The flow metering transducer 200 comprises a first transducer means 203 adapted to provide a voltage which is proportional to the pressure difference $(P_1-P_2)$ across the venturi 202. Such pressure difference transducers are well known in the art and so it has been only shown schematically. Receiving the voltage output of the first transducer means 203 is a second transducer means 204 adapted to provide a voltage which is accurately and directly proportional to the ratio of the upstream pressure $P_1$ to the first power of the upstream absolute temperature $T_1$. The second transducer means 204 is also adapted to multiply its voltage by the voltage from said first transducer means 203. From the foregoing description, the construction and operation of the second transducer means 204 will be obvious to one skilled in the art. For example, inn FIG. 5, the voltage input is simply the voltage output of the first transducer means 203. Finally, a circuit means 205 is adapted to receive the voltage output of the second transducer means 204 and then provide a voltage which is the square root of said voltage output. Such circuit means are well known to the prior art and so are only shown schematically. Since the mass flow rate in a venturi device is proportional to the square root of the product of the pressure difference and the ratio of upstream pressure to upstream absolute temperature, the voltage output of the circuit means 205 is proportional to the mass flow rate of the gas.

Figure 9:
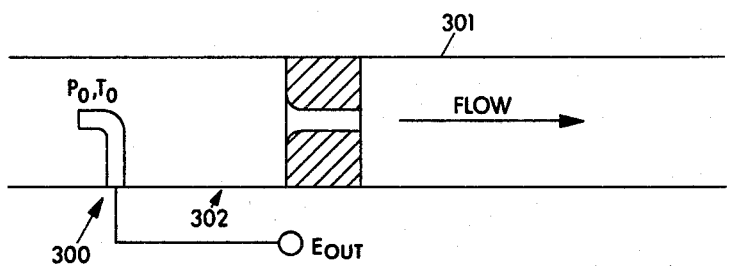
FIGURE 9 is a schematic diagram of another specific application of the present invention.

Shown in FIG. 9 is a flow metering transducer 300 adapted to provide a voltage which is accurately and directly proportional to the mass flow rate of a gas in a conduit 301 containing a critical flow gas control means 302. The flow metering transducer 300 is adapted to provide a voltage which is proportional to the ratio of the stagnation pressure $P_0$ to the square root of the stagnation absolute temperature $T_0$. From the foregoing description, the construction and operation of the transducer 300 will be obvious to one skilled in the art. For example, substantially the same transducer described above may be utilized except that the positive power of temperature is compensated to 0.5 rather than 1. Since the mass flow rate in a critical flow nozzle is proportional to the ratio stagnation pressure $P_0$ to the square root of the stagnation absolute temperature $T_0$, the voltage output of the transducer 300 is proportional to the mass flow rate of the gas.

Figure 10:
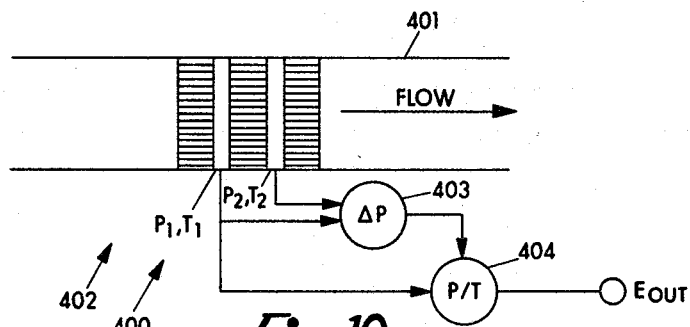
FIGURE 10 is a schematic of another specific application of the present invention.

Shown in FIG. 10 is a flow metering transducer 400 adapted to provide a voltage which is accurately and directly proportional to the mass flow rate of a gas in a conduit 401 containing a laminar flow gas control means 402. The transducer 400 comprises a first transducer means 403 adapted to provide a voltage which is proportional to the pressure difference $(P_1-P_2)$ across the gas control means 402. Receiving the voltage output of the first transducer means 403 is a second transducer means 404 adapted to provide a voltage which is accurately and directly proportional to the ratio of the higher pressure $P_1$ in the gas control means 402 to a positive power of the absolute temperature $T_1$ associated with said higher pressure $P_1$. Also the second transducer means 404 is adapted to multiply its voltage by the voltage from the first transducer means 403. The positive power of absolute temperature $T_1$ is slightly greater than one by an amount corresponding to the gas viscosity, i.e., approximately 0.1, since the mass flow rate is inversely proportional to the product of the first power of absolute temperature and the gas viscosity has slightly positive temperature coefficient. From the foregoing description, the construction and operation of the second transducer means 404 will be obvious to one skilled in the art. For example, the second transducer means 404 is substantially similar to the second transducer means 204 except that the positive power of temperature is compensated to slightly greater than one rather than one.

Figure 11:
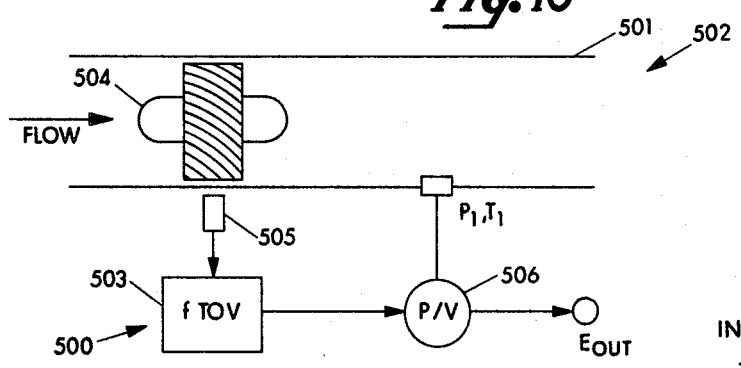
FIGURE 11 is a schematic diagram of another specific application of the present invention.

Shown in FIG. 11 is a flow metering transducer 500 adapted to provide a voltage which is accurately and directly proportional to the mass flow rate of a gas in a conduit 501 containing a turbine meter 502. The transducer 500 comprises a first transducer means 503 adapted to provide a voltage which is proportional to the frequency output of the turbine meter 502 composed basically of the turbine 504 and a pick-up coil 505. The first transducer means 503 is well known to the prior art in the form of counting-rate circuits so it has been shown only schematically. Receiving the voltage output of the first transducer means 503 is a second transducer means 506 adapted to provide a voltage which is accurately and directly proportional to the ratio of the pressure $P_1$ adjacent to the meter 502 to the first power of absolute temperature $T_1$ associated with the pressure $P_1$. The second transducer means 506 is also adapted to multiply its voltage by the voltage from the first transducer means 503. Again from the foregoing description, the construction and operation of the second transducer means 506 will be obvious to one skilled in the art. It should be noted that the voltage output of the second transducer means could be used as the reference voltage for the first transducer means at least in some of the above examples or the transducer outputs could be set up in terms of current rather than voltage in at least the last example.

As set forth above, to obtain a transducer having a voltage output which is proportional to the ratio of a given variable to only a selected positive power of absolute temperature, the desired temperature compensation can be attained simply by compensating one component of the transducer to change a function of absolute temperature to only a selected positive power of absolute temperature. Thus, when the temperature relationship can be accurately approximated by simply a linear relationship with the constant, $a$, in Equation 2 equal to some positive value, the temperature compensation among other results reduces such constant substantially to zero. Conversely, if the construction of the transducer produces linear relationship with a negative constant, $a$, because of some variation in one or more of the components of the transducer, the same techniques discussed above can be utilized to provide a temperature compensation in the opposite direction, i.e., to increase the slope of the transducer sensitivity-temperature curve to achieve the desired result of transducer voltage output proportional to the ratio of pressure to only a selected positive power of absolute temperature.

It should be recognized that the relationship between transducer sensitivity and temperature is more complex than simply being inversely proportional to some linear function of temperature. More accurately, its function should contain at least a second order term and also higher order terms depending on the accuracy desired. Also, it has been found that for a large temperature compensation, the techniques set forth above the effects of the second and higher order terms are decreased, i.e., the temperature function more closely approximates a linear function. Consequently, the transducer of the present invention preferably utilizes at least one of the above described temperature compensation techniques to achieve an over compensation of the temperature effect so that if the initial constant, $a$, in the above equation is positive the resulting constant, $a$, is negative. Then the temperature relationship is counteracted or brought back to the desired relationship by a second compensation technique. With such arrangement, the resulting temperature relationship much more effectively eliminates a second order and higher order temperature effects. A specific example of such technique is to over-compensate for the temperature factor by very light doping of the bodies of semiconductor material and then decreasing the slope of the transducer sensitivity-temperature curve to the desired relationship by a series resistance in the bridge input when it is supplied with constant voltage source.

There are many features in the present invention which clearly show the significant advance the present invention represents over the prior art. Consequently, only a few of the more outstanding features will be pointed out to illustrate the unexpected and unusual results attained by the present invention. As set forth in the initial portion of the present application, it has been known for years that bodies of semiconductor materials can be used to measure pressure or temperature by incorporating them in well known transducer structures. Thus, if the ratio of pressure and temperatue was desired, the outputs of the two transducers would be fed to an appropriate electrical circuit to achieve an output related to such ratio. In contrast to such an approach in the transducer of the present invention, the desired computation of the ratio of pressure to temperature is achieved by utilizing the characteristics of one set of bodies of semiconductor material. In other words, rather than compensating out the piezoresistive effect of the temperature gage or the temperature effect of the presesure gage, the transducer of the present invention utilizes both effects simultaneously by compensating for unwanted deviations from the desired relationship and thereby produces an output from a single transducer which gives directly the ratio of pressure to only a selected positive power of absolute temperature. Another feature of the present invention is the compensation for temperature effects by using any one or more components of the transducer so that the output is proportional to the ratio of a given variable to only a selected positive power of absolute temperature. Such result is in marked contrast to the transducers of the prior art such as pressure transducers accelerometers, and so forth, which compensate for temperature effects so that their output is independent of temperature. Still another feature of the present invention is the utilization of at least two temperature compensation techniques with two different components of the transducer so that not only is the desired temperature relation achieved but also the second order and higher order temperature effects inherently present in semiconductor material are substantially reduced. Still another feature of the present invention is transducers and methods for various flow metering applications which include a transducer providing a voltage proportional to the ratio of pressure to a selected positive power of absolute temperature.

It will be understood that the foregoing description and examples are only illustrative of the present invention and it is not intended that the invention be limited thereto. All substitutions, alternations, and modifications of the present invention which come within the scope of the following claims or to which the present invention is susceptible without departing from the spirit and scope of this disclosure are considered part of the present invention.

Having thus described the invention, what is claimed is:

1. A transducer adapted to provide a voltage which is accurately and directly proportional to the ratio of a selected variable to only a selected positive power of absolute temperature comprising the following components:
   (a) at least two bodies of semiconductor material, (I) The first of said bodies being subjected to a first strain corresponding to the value of the selected variable being measured and being subjected to the temperature being measured, and (II) the second of said bodies being subjected to a second substantially different strain corresponding to the value of the selected variable being measured and being subjected to the temperature being measured;
   (b) an electrical bridge circuit having each of said bodies connected in a leg of said circuit; and,
   (c) a carrier structure supporting said bodies and adapted to translate the effect of said selected variable into strain on said bodies, said transducer being adapted to provide a voltage which is directly proportional to the ratio of the selected variable to a function of absolute temperature without temperature compensation and at least one of said components includes means for compensating for said temperature function so that said voltage output is proportional to the ratio of said selected variable to only a selected positive power of absolute temperature.

2. A transducer as stated in claim 1 wherein said positive power of absolute temperature is $T^n$ where $0.1 \leq n \leq 2$.

3. A transducer as stated in claim 1 wherein said bodies of semiconductor material are doped in such a way as to compensate for said temperature function.

4. A transducer as stated in claim 1 wherein said electrical bridge circuit includes means to compensate for said temperature function.

5. A transducer as stated in claim 4 wherein said bridge circuit includes a constant voltage power supply and a shunt resistance across its output leads having a preselected resistance sufficient to compensate for said temperature function.

6. A transducer as stated in claim 1 wherein said carrier structure includes means to compensate for said temperature function.

7. A transducer as stated in claim 6 wherein said carrier structure temperature compensating means comprises a clamped edge diaphragm and an expansion ring mounted in a housing, said expansion ring having a thermal coefficient of expansion adapted to compensate for said temperature function.

8. A transducer as stated in claim 1 wherein one of said components includes means to overcompensate for said temperature function and another of said components is adapted to counteract said overcompensation.

9. A transducer as stated in claim 1 which includes four bodies of semiconductor material with two of said bodies being subjected to said first strain, the other two of said bodies being subjected to said second strain.

10. A transducer as stated in claim 9 wherein said four bodies of semiconductor material are P-type and said first strain is tension strain and said second strain is compression strain.

11. A method of measuring accurately and directly a ratio of a selected variable to only a selected positive power of absolute temperature comprising:
(a) forming a first component comprising at least two bodies of semiconductor material and supporting said first component on a second component comprising a carrier structure adapted to subject the first of said bodies to a first strain corresponding to the value of said selected variable being measured and to the temperature being measured and to subject the second of said bodies to a second substantially different strain corresponding to the value of said selected variable being measured and the temperature being measured;
(b) forming a third component comprising an electrical bridge circuit having each of said bodies connected in a leg of said circuit, each said components being adapted so that with a given voltage power supply to said bridge circuit a voltage is produced which is directly proportional to the ratio of said selected variable to a function of absolute temperature without temperature compensation;
(c) adapting at least one of said components so that said voltage output is proportional to the ratio of said selected variable to only a selected positive power of absolute temperature;
(d) subjecting said components to the selected variable and temperature being measured;
(e) supplying a predetermined voltage to said bridge circuit; and
(f) measuring the voltage output of said bridge circuit.

12. A method as stated in claim 11 wherein said positive power of absolute temperature is $T^n$ where $0.1 \leq n \leq 2$.

References Cited

UNITED STATES PATENTS

| | | | |
|---|---|---|---|
| 3,128,628 | 4/1964 | Lebow | 73—398 |
| 3,245,252 | 4/1966 | First et al. | 73—88.5 |
| 3,303,702 | 2/1967 | Perino | 73—398 |
| 3,325,761 | 6/1967 | McLellan | 73—398 XR |
| 3,333,472 | 8/1967 | McLellan | 73—393 |

DAVID SCHONBERG, *Primary Examiner.*